United States Patent
McBride et al.

(10) Patent No.: US 10,289,476 B2
(45) Date of Patent: May 14, 2019

(54) ASYNCHRONOUS MIRROR INCONSISTENCY CORRECTION

(71) Applicant: International Business Machines Corporation, Armonk, NY (US)

(72) Inventors: Gregory E. McBride, Vail, AZ (US); David C. Reed, Tucson, AZ (US); Warren K. Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/411,983

(22) Filed: Jan. 21, 2017

(65) Prior Publication Data
US 2018/0210781 A1    Jul. 26, 2018

(51) Int. Cl.
*G06F 11/00* (2006.01)
*G06F 11/07* (2006.01)
*G06F 11/20* (2006.01)

(52) U.S. Cl.
CPC ...... *G06F 11/0793* (2013.01); *G06F 11/0709* (2013.01); *G06F 11/079* (2013.01); *G06F 11/0727* (2013.01); *G06F 11/0751* (2013.01); *G06F 11/0772* (2013.01); *G06F 11/2056* (2013.01); *G06F 11/2074* (2013.01); *G06F 11/2082* (2013.01)

(58) Field of Classification Search
CPC .............. G06F 11/2074; G06F 11/2082; G06F 11/2056
See application file for complete search history.

(56) References Cited

U.S. PATENT DOCUMENTS

| 5,544,347 A | 8/1996 | Yanai et al. |
| 6,044,444 A | 3/2000 | Ofek |
| 6,052,797 A | 4/2000 | Ofek et al. |

(Continued)

OTHER PUBLICATIONS

IP.com, "Integrated distance simulator for asynchronous remote copy (Global Mirror)," IP.com No. IPCOM000146731D, Feb. 20, 2007.

(Continued)

*Primary Examiner* — Charles Ehne
(74) *Attorney, Agent, or Firm* — Nelson and Nelson; Daniel P. Nelson; Alexis V. Nelson (57) ABSTRACT

A method for correcting data inconsistency in an asynchronous data replication environment is disclosed. In one embodiment, such a method includes detecting an error on a secondary track of a secondary volume, wherein the secondary volume is in a mirroring relationship with a primary volume. In response to detecting the error, the method flags the secondary track as "temporarily inconsistent." The method then issues a command to read a corresponding primary track from the primary volume, records a time when the primary track was read, and mirrors the primary track and time to the secondary volume. The method then applies, to the secondary track, updates to the secondary track having a timestamp earlier than the time, and applies the primary track to the secondary track. The method then unflags the secondary track as "temporarily inconsistent." A corresponding system and computer program product are also disclosed.

20 Claims, 8 Drawing Sheets

(56) References Cited

U.S. PATENT DOCUMENTS

| | | | |
|---|---|---|---|
| 6,578,120 B1* | 6/2003 | Crockett | G06F 3/0601 |
| | | | 711/114 |
| 6,957,221 B1 | 10/2005 | Hart et al. | |
| 7,103,619 B1 | 9/2006 | Rajpurkar et al. | |
| 8,996,841 B2 | 3/2015 | Kuligowski et al. | |
| 9,053,073 B1* | 6/2015 | Subramanian | G06F 11/2064 |
| 2003/0028723 A1* | 2/2003 | Segev | G06F 11/2071 |
| | | | 711/113 |
| 2004/0230859 A1 | 11/2004 | Cochran et al. | |
| 2005/0154786 A1* | 7/2005 | Shackelford | G06F 11/2074 |
| | | | 709/217 |
| 2006/0277384 A1 | 12/2006 | Yagawa et al. | |
| 2007/0073985 A1* | 3/2007 | Wilkes | G06F 11/2064 |
| | | | 711/161 |
| 2009/0249116 A1* | 10/2009 | Bartfai | G06F 11/2066 |
| | | | 714/6.12 |

OTHER PUBLICATIONS

IP.com, "A method to mirror host new modified data with minimum storage space for remote copy suspension," IP.com No. IPCOM000235428D, Feb. 27, 2014.

IP.com, "I/O Priority Management for Copy Services Relationships," IP.com No. IPCOM000198983D, Aug. 19, 2010.

* cited by examiner

ASYNCHRONOUS MIRROR INCONSISTENCY CORRECTION

BACKGROUND

Field of the Invention

This invention relates to systems and methods for auditing and correcting data inconsistencies in data replication systems.

Background of the Invention

In z/OS Global Mirror, data is asynchronously mirrored from a primary storage system to a secondary storage system in order to maintain two consistent copies of data. The primary and secondary storage systems may be located at different sites, perhaps hundreds or thousands of miles away from one another. In the event the primary storage system fails, I/O may be redirected to the secondary storage system, thereby enabling continuous operations.

When updates are received at the primary storage system, z/OS Global Mirror groups the updates into record sets and collects these record sets into data structures referred to as "sidefiles." These sidefiles are stored in cache at the primary storage system. The record sets in these sidefiles are then asynchronously mirrored to the secondary storage system using data replication software (also known as System Data Mover, or SDM, in the z/OS environment) which is typically (but not necessarily) hosted on a secondary host system.

Currently, when asynchronously mirroring data from a source volume to a target volume, it is very difficult to determine if there are inconsistencies in the mirrored data. When an error such as a No Record Found (NRF) or Invalid Track Format (ITF) error occurs at the target volume, the mirroring relationship is typically suspended and data in the source volume is recopied to the target volume. The mirroring relationship between the source volume and target volume may then be reestablished. If an error is detected long after an out-of-sync condition occurs, it may be difficult to diagnose the cause of the error. Currently, the only option to validate the consistency of mirrored data is to compare, track by track, the source and target volumes. This creates significant overhead and may result in false errors when updates to the target volume are in flight.

In view of the foregoing, what are needed are systems and methods to more effectively audit data consistency across source and target volumes in asynchronous data replication environments. Further needed are systems and methods to more efficiently correct errors in consistency when discovered.

SUMMARY

The invention has been developed in response to the present state of the art and, in particular, in response to the problems and needs in the art that have not yet been fully solved by currently available systems and methods. Accordingly, the invention has been developed to provide systems and methods for correcting data inconsistency in an asynchronous data replication environment. The features and advantages of the invention will become more fully apparent from the following description and appended claims, or may be learned by practice of the invention as set forth hereinafter.

Consistent with the foregoing, a method for correcting data inconsistency in an asynchronous data replication environment is disclosed. In one embodiment, such a method includes detecting an error on a secondary track of a secondary volume, wherein the secondary volume is in a mirroring relationship with a primary volume. In response to detecting the error, the method flags the secondary track as "temporarily inconsistent." The method then issues a command to read a corresponding primary track from the primary volume, records a time when the primary track was read, and mirrors the primary track and time to the secondary volume. The method then applies, to the secondary track, updates to the secondary track having a timestamp earlier than the time, and applies the primary track to the secondary track after the updates have been applied. The method then unflags the secondary track as "temporarily inconsistent."

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
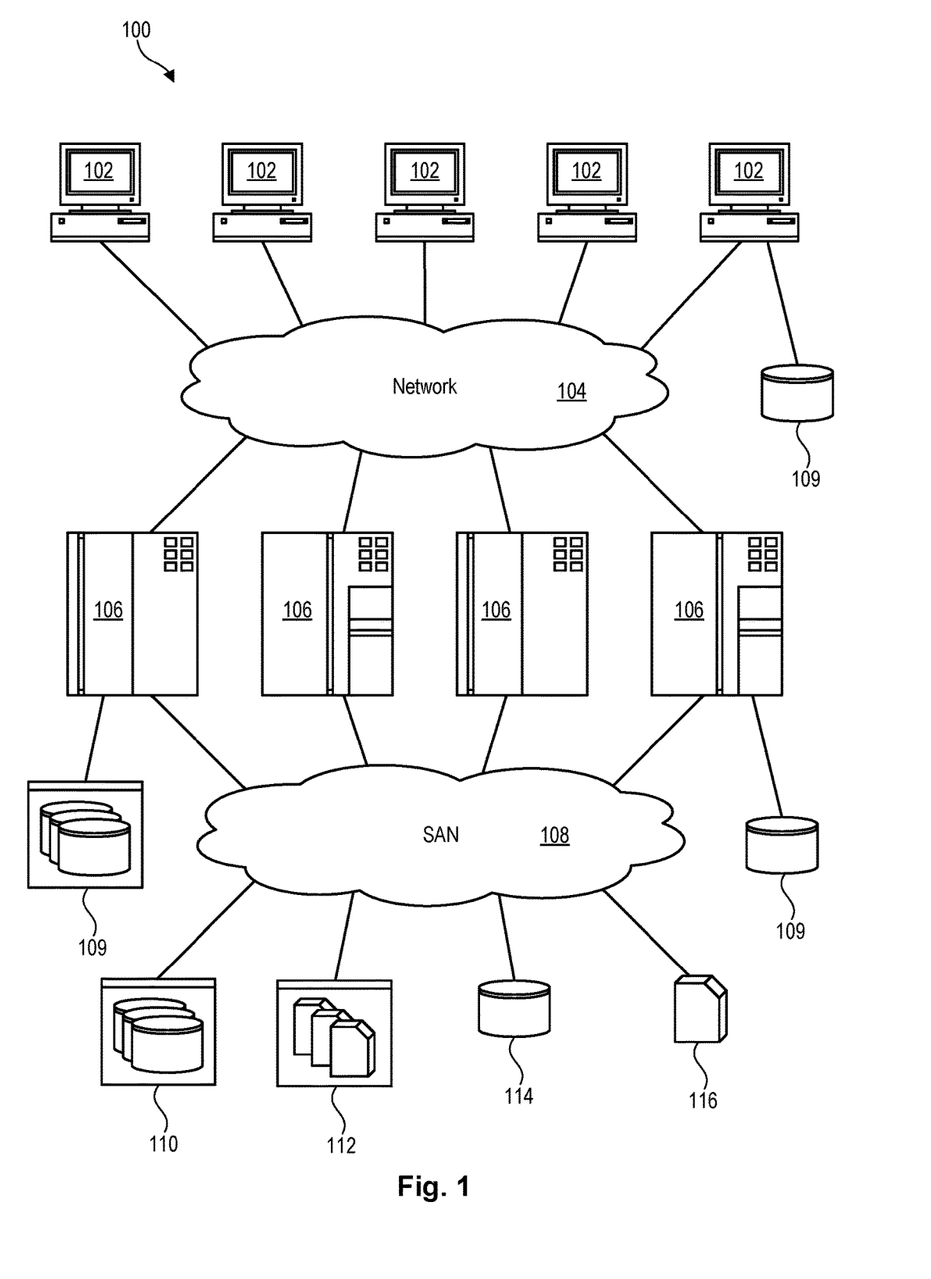
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
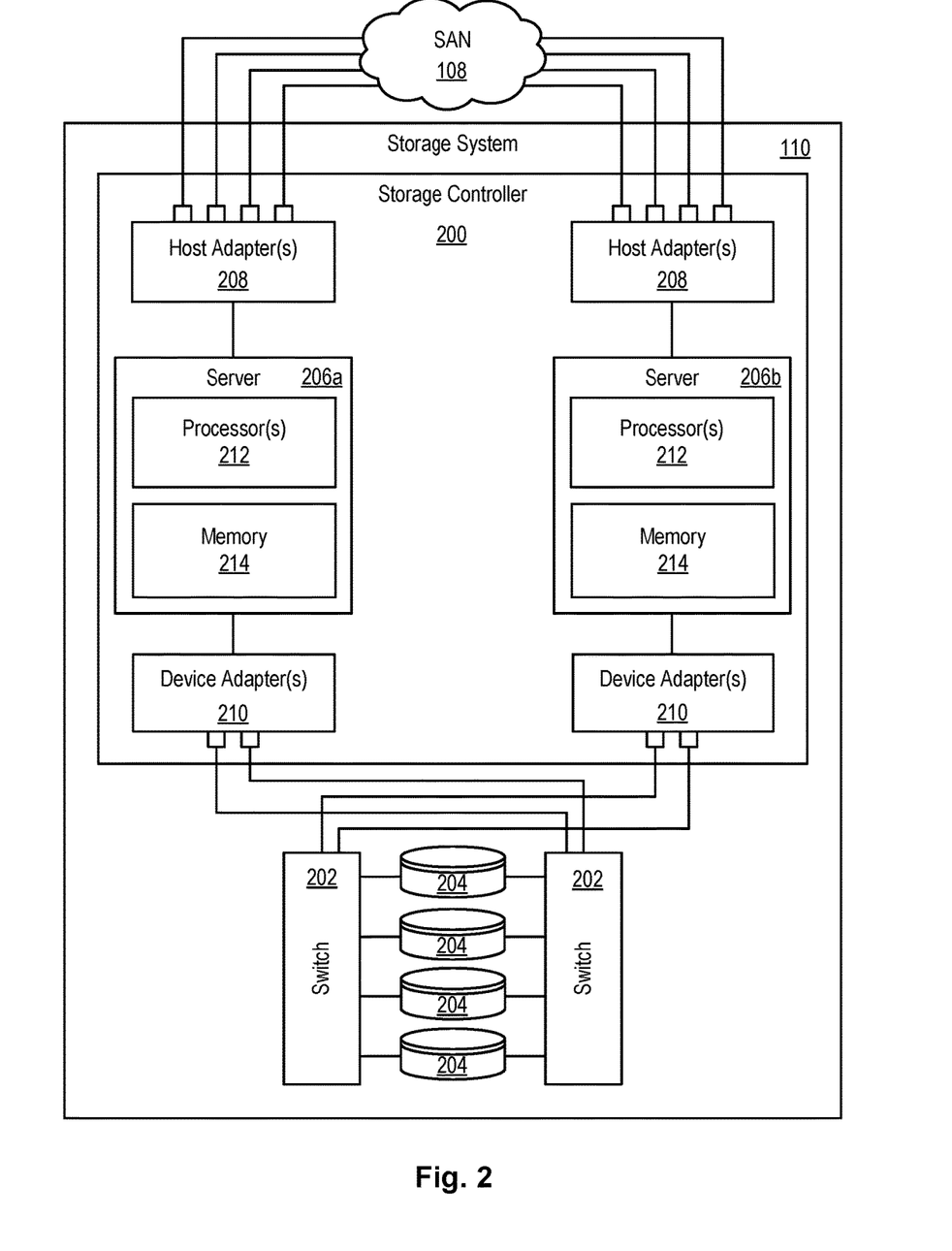
FIG. 2 is a high-level block diagram showing one example of a storage system that may function as a primary or secondary storage system in an asynchronous data replication system.

Referring to FIG. 2, one embodiment of a storage system 110 containing an array of hard-disk drives 204 and/or solid-state drives 204 is illustrated. Such a storage system may function as a primary or secondary storage system in an asynchronous data replication system. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such as z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
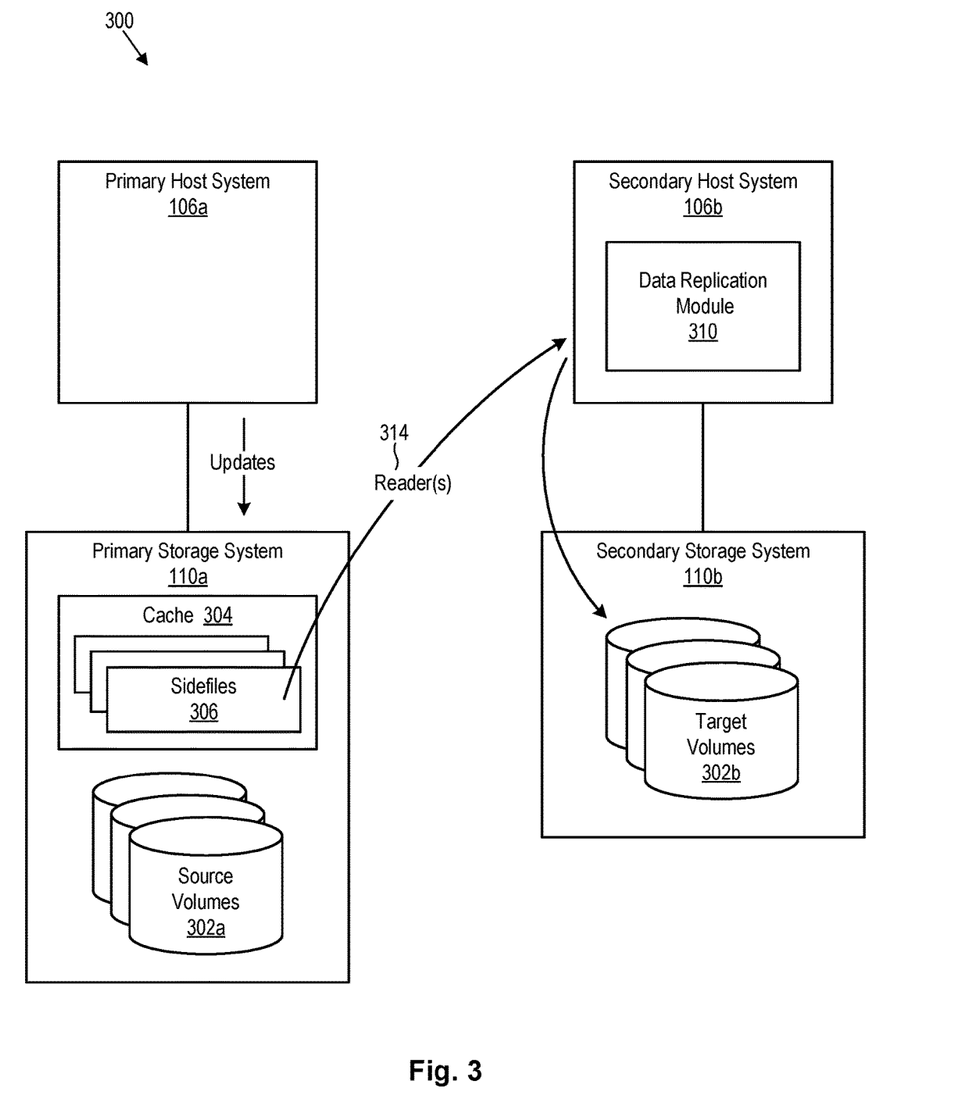
FIG. 3 is a high-level block diagram showing how an asynchronous data replication may use sidefiles to asynchronously mirror data from a primary storage system to a secondary storage system.

Referring to FIG. 3, as previously mentioned, in z/OS Global Mirror, data is asynchronously mirrored from primary volumes 302a on a primary storage system 110a to secondary volumes 302b on a secondary storage system 110b in order to maintain two consistent copies of data. The primary and secondary storage systems 110a, 110b may be located at different sites, perhaps hundreds or thousands of miles away from one another. In the event the primary storage system 110a fails, I/O may be redirected to the secondary storage system 110b, thereby enabling continuous operations.

When updates are received by the primary storage system 110a from a primary host system 106a, z/OS Global Mirror groups the updates into record sets and collects these record sets in data structures referred to as sidefiles 306 (collectively referred to herein as a "sidefile queue" 306). These sidefiles 306 are stored in cache 304 (a high-speed form of memory 214) of the primary storage system 110a. The record sets in these sidefiles 306 are asynchronously mirrored to the secondary storage system 110b using a data replication module 310 (also known as System Data Mover, or SDM, in the z/OS environment) that is typically hosted on a secondary host system 106b. This data replication module 310 typically utilizes readers 314 to copy data from the sidefiles 306 to the secondary storage system 110b. Each reader 314 or group of readers 314 typically copies record sets from a specific sidefile 306 in the primary cache 304 to the secondary storage system 110b.

Currently, when asynchronously mirroring data from a source volume 302a to a target volume 302b, it is very difficult to determine if there are inconsistencies in the mirrored data. When an error such as a No Record Found (NRF) or Invalid Track Format (ITF) error occurs at the target volume 302b, the mirroring relationship is typically suspended and data in the source volume 302a is recopied to the target volume 302b. The mirroring relationship between the source volume 302a and target volume 302b may then be reestablished. If an error is detected long after an out-of-sync condition occurs, it may be difficult to diagnose the cause of the error.

Currently, the only option to validate the consistency of mirrored data is to compare, track by track, the source and target volumes 302a, 302b. This creates significant overhead and may result in false errors when updates to the target volume 302b are in flight. Thus, systems and methods are needed to more effectively audit data consistency across source and target volumes 302a, 302b in asynchronous data replication environments 300. Further needed are systems and methods to more efficiently correct errors in consistency when discovered.

Figure 4:
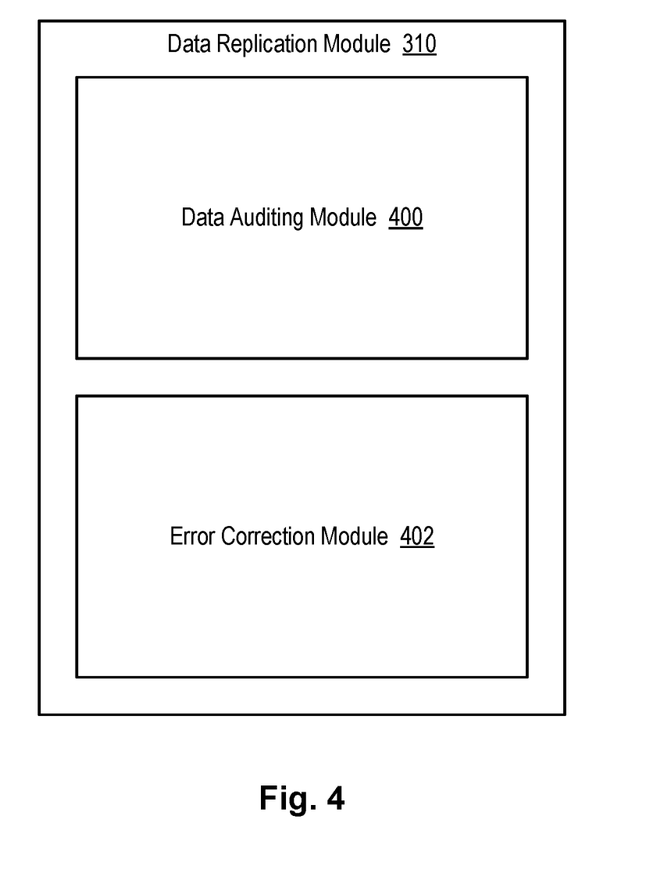
FIG. 4 is a high-level block diagram showing a data replication module and various sub-modules that may be used to implement various aspects of the invention.

Referring to FIG. 4, in order to more effectively audit data consistency across source and target volumes 302a, 302b, and more efficiently correct errors in consistency when discovered, various modules 400, 402 may be provided in or in association with the data replication module 310. These modules may be implemented in hardware, software, firmware, or combinations thereof. In particular, a data auditing module 400 may be provided to more effectively audit data consistency across source and target volumes 302a, 302b. One example of a method that may be executed by the data auditing module 400 will be discussed in association with FIG. 7. An error correction module 402 may be provided to more efficiently correct errors in consistency when such errors are discovered. One example of a method that may be executed by the error correction module 402 will be discussed in association with FIG. 8. Although the modules 400, 402 are shown as sub-modules in the data replication module 310, they are not necessarily part of the data replication module 310, nor are they limited to implementation within the secondary host system 106b. Thus, the location of the data auditing module 400 and error correction module 402 are provided by way of example and not limitation.

Figure 5:
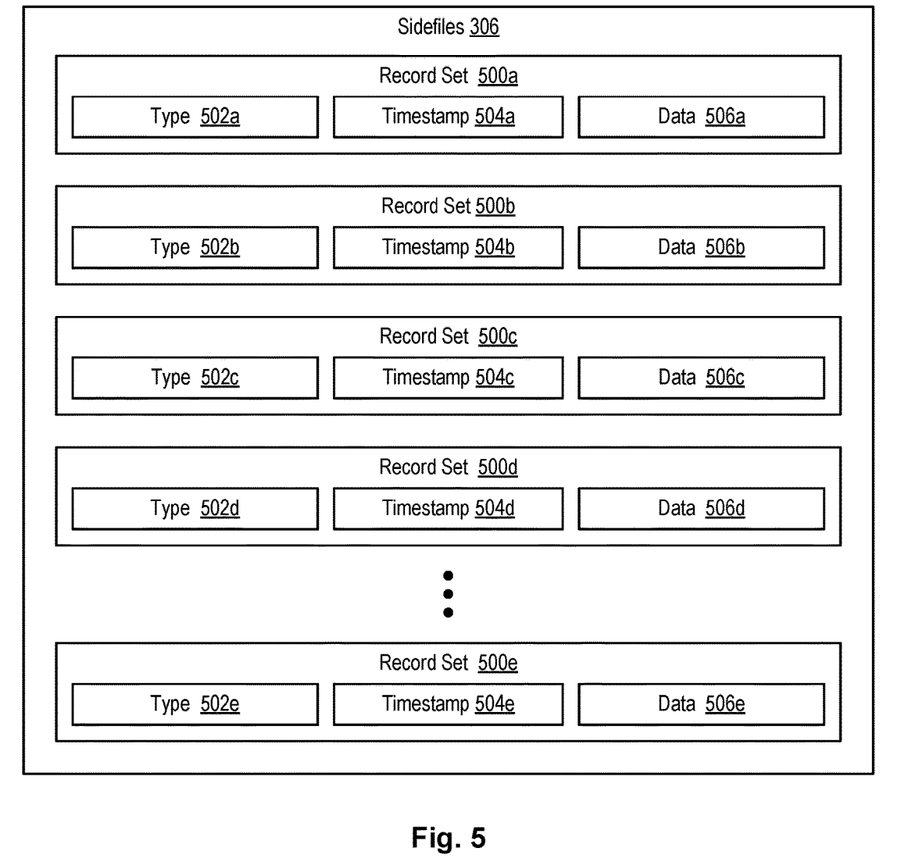
FIG. 5 is a high-level block diagram showing how record sets may be processed in sidefiles.

Referring to FIG. 5, as previously mentioned, when updates are received by the primary storage system 110a from a primary host system 106a and applied to a source volume 302a, the updates may be grouped into record sets 500 and placed in sidefiles 306. The data replication module 310 may then asynchronously mirror these record sets 500 to the secondary storage system 110b so that the data can be applied to the target volume 302b. As shown, the record sets 500 may be characterized by a type 502, timestamp 504, and data 506 (e.g., a track of data). The type 502 may, in certain embodiments, indicate what is to be done with the data 506 in the record set 500. For example, the type 502 may indicate that the data 506 is to be applied to or written to corresponding data or storage element (e.g., track) on a target volume 302b. The timestamp 504 may indicate a time the data 506 was written to or read from a source volume 302a. In certain embodiments, the data replication module 310 may apply record sets 500 to the target volume 302b in order of their timestamps 504 to maintain data consistency with the source volume 302a.

Figure 6:
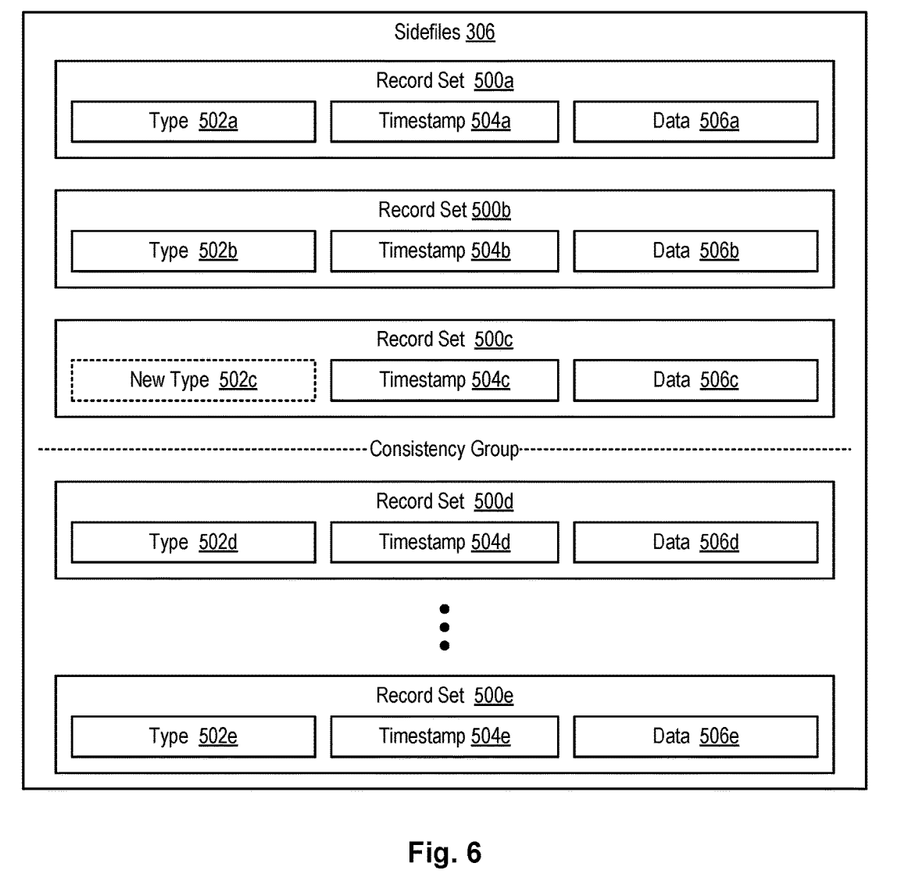
FIG. 6 is a high-level block diagram showing a new type of record set for use in auditing and/or correcting data consistency.

Referring to FIG. 6, in certain embodiments in accordance with the invention, a new "write with no data" command may be created that acts as if a storage element (e.g., track) on the source volume 302a was updated. However, no data may actually be written to the source volume 302a. Rather the new command may serialize the storage element on the source volume 302a as if a write occurred and create a record set 500c in the sidefile queue 306 that contains all of the data 506c in the storage element at a specified time (as indicated by the timestamp 504c). FIG. 6 shows a new type 502c of record set 500c that may be created and stored in the sidefile queue 306 by the new command. When read by the data replication module 310, the new type 502c may indicate that the data 506c in the record set 500c is not an update to be applied or written to the target volume 302b. The data replication module 310 may recognize this new type and process a consistency group such that the timestamp 504c of the record set 500c is the consistency group cutoff time. This means that all updates (i.e., record sets 500) having a timestamp 504 earlier than the timestamp 504c will be applied to the source volume 302a, while not applying record sets 500 having a timestamp 504 later than the timestamp 504c. This will cause the target volume 302b to ideally have the same data as the source volume 302a at the time the new record set 500c was created on the primary storage system 110a.

Figure 7:
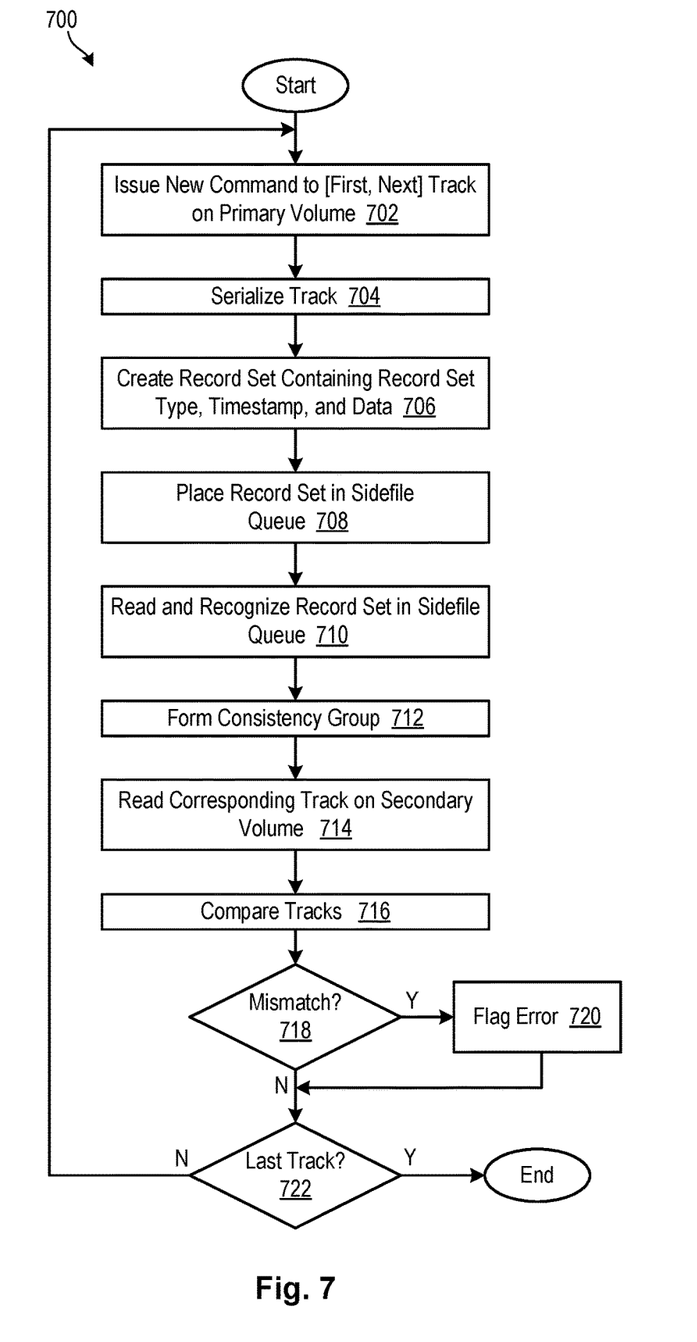
FIG. 7 is a process flow diagram showing one embodiment of a method for auditing data consistency across source and target volumes.

Referring to FIG. 7, one embodiment of a method 700 for auditing data consistency across source and target volumes 302a, 302b is illustrated. As shown, the method 700 initially issues 702 the new "write with no data" command discussed in association with FIG. 6 for a first track on the source volume 302a. This new command may act as if the first track is being updated, while not actually writing any data to the first track. Rather the new command may serialize 704 the track on the source volume 302a as if a write occurred and create 706 a record set 500c that contains all of the data 506c in the track at the time the new command is executed. This record set 500c may also contain a timestamp 504c indicating when the new command was executed and a type 502c that indicates that the data 506c in the record set 500c is not an update to be applied to the target volume 302b.

Once the record set 500c is generated at step 706, the method 700 places 708 the record set 500c in the sidefile queue 306. This record set 500c is then asynchronously mirrored to the secondary storage system 110b, and more particularly the target volume 302b, as time and resources allow. Upon receiving the record set 500c at the target volume 302b, the method 700 reads 710 and recognizes the record set 500c as the new type described above, and forms 712 a consistency group at the target volume 302b. The method 700 then reads 714 the corresponding track on the target volume 302b and compares 716 this track with the track in the record set 500c. If the method 700 determines 718 that the tracks do not match or are inconsistent, the method 700 flags an error.

The method 700 then determines 722 whether there are more tracks to be analyzed. If so, the method 700 issues 702 the new "write with no data" command for the next track on the source volume 302a and the method 700 repeats in the manner previously described. This may occur until all tracks on the source volume 302a have been compared to all tracks on the target volume 302b. Alternatively, only tracks of interest may be compared. For example, when an error such as a No Record Found (NRF) or Invalid Track Format (ITF) error occurs, only tracks related to the error in some way may be analyzed using the method 700 of FIG. 7. Once all tracks or tracks of interest have been analyzed, the method 700 ends.

Figure 8:
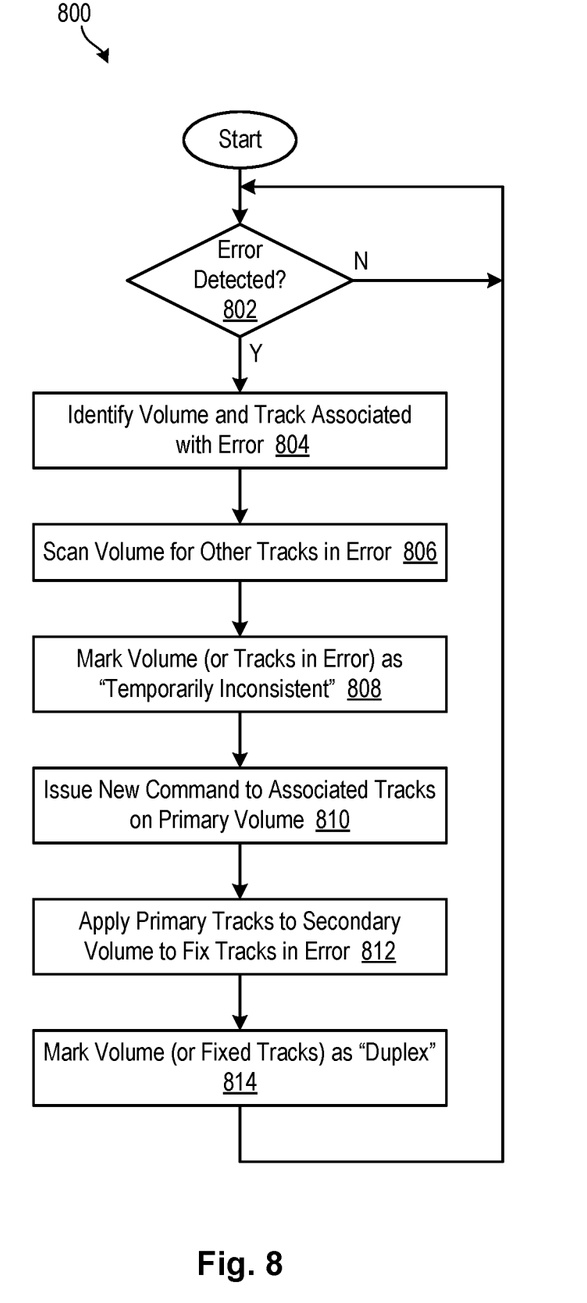
FIG. 8 is a process flow diagram showing one embodiment of a method for correcting data inconsistency across source and target volumes.

Referring to FIG. 8, one embodiment of a method 800 for correcting data inconsistency across source and target volumes 302a, 302b is illustrated. As shown, the method 800 initially determines 802 whether an error has been detected on a target volume 302b. The error may include data inconsistency (as detected at step 718 of FIG. 7, for example) or an error such as a No Record Found (NRF) or Invalid Track Format (ITF) error that occurs when applying data to the target volume 302b. In response, the method 800 identifies 804 the target volume 302b and track on the target volume 302b associated with the error and audits 806 the source volume 302a and target volume 302b for other errors. This audit may occur to the entire volumes 302a, 302b or just to areas related to the error or believed to be susceptible to errors. This auditing step 806 may be performed using the method 700 illustrated in FIG. 7.

The target volume 302b or specific tracks in error on the target volume 302b may then be marked 808 as "temporarily inconsistent." This may indicate that some data on the target volume 302b is not consistent with some data on the source volume 302a or has been lost for some reason. Marking the target volume 302b as "temporarily inconsistent" may avoid the need to suspend the mirroring relationship between the source volume 302a and target volume 302b, which may be considered a significant outage and trigger reporting requirements (such as government reporting requirements). Instead a target volume 302b or specific tracks in error on the target volume 302b may be identified as "temporarily inconsistent" and fixed on the fly without suspending the mirroring relationship. This will enable updates to continue to the target volume 302b and even possibly to the tracks on the target volume 302b that were identified as in error.

Once the target volume 302b or specific tracks in error on the target volume 302b are marked as "temporarily inconsistent," the method 800 may issue 810 the new "write with no data" command described in association with FIG. 6 for tracks on the source volume 302a for which corresponding errors have been found on the target volume 302b. This will generate record sets 500c containing data from the source volume 302a, and associated timestamps 504 indicating when the data was read from the source volume 302a. These record sets 500c are placed in the sidefile queue 306 for asynchronous mirroring to the target volume 302b.

At the target volume 302b, record sets 500 in the sidefile queue 306 may be applied to the target volume 302b in timestamp order. When a record set 500c is encountered at the target volume 302b that was generated by the new "write with no data" command, the method 800 applies 812 a consistency group to the target volume 302b. This will fix the track associated with the new record set 500c. This process of reading the new record sets 500c from the sidefile queue 306 and applying a consistency group is repeated until all tracks in error have been fixed on the target volume 302b. Once all errors have been fixed, the method 800 marks 814 the target volume 302b or tracks previously in error (but since fixed) on the target volume 302b as "duplex," which indicates that data on the source volume 302a and target volume 302b is known or believed to be in a consistent state.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for correcting data inconsistency in an asynchronous data replication environment, the method comprising:
   detecting an error wherein data is not as expected on a secondary track of a secondary volume, wherein the secondary volume is in a mirroring relationship with a primary volume; and
   correcting the error as follows:
      flagging the secondary track as "temporarily inconsistent";
      issuing a command to read a corresponding primary track from the primary volume, recording a time when the primary track was read, and mirroring the primary track and time to the secondary volume;
      applying, to the secondary track, updates to the secondary track having a timestamp earlier than the time;
      applying the primary track to the secondary track after the updates have been applied; and
      unflagging the secondary track as "temporarily inconsistent".

2. The method of claim 1, wherein mirroring the primary track and time to the secondary volume comprises placing the primary track and time in a sidefile queue associated with the primary volume.

3. The method of claim 2, wherein the sidefile queue contains data for replication from the primary volume to the secondary volume.

4. The method of claim 1, wherein mirroring the primary track and time to the secondary volume comprises asynchronously mirroring the primary track and time to the secondary volume.

5. The method of claim 1, wherein detecting the error further comprises initiating a scan of the secondary volume for other errors.

6. The method of claim 1, wherein flagging the secondary track as "temporarily inconsistent" comprises flagging the entire secondary volume as "temporarily inconsistent".

7. The method of claim 1, further comprising forming a consistency group after applying the primary track to the secondary track.

8. A computer program product for correcting data inconsistency in an asynchronous data replication environment, the computer program product comprising a non-transitory computer-readable storage medium having computer-usable program code embodied therein, the computer-usable program code configured to perform the following when executed by at least one processor:
   detect an error wherein data is not as expected on a secondary track of a secondary volume, wherein the secondary volume is in a mirroring relationship with a primary volume; and
   correct the error as follows:
      flag the secondary track as "temporarily inconsistent";
      issue a command to read a corresponding primary track from the primary volume, record a time when the primary track was read, and mirror the primary track and time to the secondary volume;
      apply, to the secondary track, updates to the secondary track having a timestamp earlier than the time;
      apply the primary track to the secondary track after the updates have been applied; and
      unflag the secondary track as "temporarily inconsistent".

9. The computer program product of claim 8, wherein mirroring the primary track and time to the secondary volume comprises placing the primary track and time in a sidefile queue associated with the primary volume.

10. The computer program product of claim 9, wherein the sidefile queue contains data for replication from the primary volume to the secondary volume.

11. The computer program product of claim 8, wherein mirroring the primary track and time to the secondary volume comprises asynchronously mirroring the primary track and time to the secondary volume.

12. The computer program product of claim 8, wherein detecting the error further comprises initiating a scan of the secondary volume for other errors.

13. The computer program product of claim 8, wherein flagging the secondary track as "temporarily inconsistent" comprises flagging the entire secondary volume as "temporarily inconsistent".

14. The computer program product of claim 8, wherein the computer-usable program code is further configured to form a consistency group after applying the primary track to the secondary track.

15. A system for correcting data inconsistency in an asynchronous data replication environment, the system comprising:
- at least one processor;
- at least one memory device operably coupled to the at least one processor and storing instructions for execution on the at least one processor, the instructions causing the at least one processor to:
  - detect an error wherein data is not as expected on a secondary track of a secondary volume, wherein the secondary volume is in a mirroring relationship with a primary volume; and
  - correct the error as follows:
    - flag the secondary track as "temporarily inconsistent";
    - issue a command to read a corresponding primary track from the primary volume, record a time when the primary track was read, and mirror the primary track and time to the secondary volume;
    - apply, to the secondary track, updates to the secondary track having a timestamp earlier than the time;
    - apply the primary track to the secondary track after the updates have been applied; and
    - unflag the secondary track as "temporarily inconsistent".

16. The system of claim 15, wherein mirroring the primary track and time to the secondary volume comprises placing the primary track and time in a sidefile queue associated with the primary volume.

17. The system of claim 16, wherein the sidefile queue contains data for replication from the primary volume to the secondary volume.

18. The system of claim 15, wherein detecting the error further comprises initiating a scan of the secondary volume for other errors.

19. The system of claim 15, wherein flagging the secondary track as "temporarily inconsistent" comprises flagging the entire secondary volume as "temporarily inconsistent".

20. The system of claim 15, wherein the instructions further cause the at least one processor to form a consistency group after applying the primary track to the secondary track.

* * * * *